UNITED STATES PATENT OFFICE.

WILLIAM G. MONK, OF BROOKLYN, NEW YORK.

IMPROVEMENT IN DRAIN-PIPES.

Specification forming part of Letters Patent No. 135,721, dated February 11, 1873.

*To all whom it may concern:*

Be it known that I, W. G. MONK, of the city of Brooklyn, in the county of Kings and State of New York, have invented a new and Improved Drain-Pipe for Sewerage or Aqueduct Purposes; and I do hereby declare the following to be a full, clear, and exact description for manufacturing the same:

In preparing my composition for said drain-pipe, I make use of two (2) parts of sulphur, four (4) parts sand, and one (1) part of cement. The sand is placed in a kettle over a fire and heated; when hot enough to melt sulphur, the sulphur is added and thoroughly mixed; then the cement is added, and the whole again thoroughly mixed until it is about the consistency of mortar; it is then placed in molds of the desired shape, and pounded or tamped—said molds being inclosed in a heated oven—which keeps the composition in its plastic state and prevents it hardening or drying too rapidly. In a short space of time after removal from the oven and mold, the pipe will become hard and dry, like stone, and will be suitable for drain-pipe, and can be furnished at less cost than clay or cement pipe.

My reason for adding the cement last is that it allows the sulphur to surround each particle of sand before the cement, thereby securing greater strength. My reason for adding the cement is that it gives greater solidity and makes the pipe water-proof.

Having thus described my invention, I claim and desire to secure by Letters Patent—

The above-described composition drain-pipe as a new article of manufacture.

W. G. MONK.

Witnesses:
 ARTHUR W. KNAPP,
 JOHN T. EASTON.